(12) United States Patent
Decaluwe et al.

(10) Patent No.: US 10,189,380 B2
(45) Date of Patent: Jan. 29, 2019

(54) CHILD-SEAT MOUNTING SYSTEM

(71) Applicant: GM Global Technology Operations LLC, Detroit, MI (US)

(72) Inventors: Mary Decaluwe, Oxford, MI (US); Joseph Neighbors, Milford, MI (US); Raymond A. Beaufait, Macomb, MI (US); William J. Ochalek, Romeo, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 54 days.

(21) Appl. No.: 15/343,525

(22) Filed: Nov. 4, 2016

(65) Prior Publication Data
US 2017/0120779 A1    May 4, 2017

Related U.S. Application Data

(60) Provisional application No. 62/250,959, filed on Nov. 4, 2015.

(51) Int. Cl.
| | |
|---|---|
| *B60N 2/20* | (2006.01) |
| *B60P 7/08* | (2006.01) |
| *B60N 2/28* | (2006.01) |
| *B60N 2/30* | (2006.01) |

(52) U.S. Cl.
CPC .............. *B60N 2/206* (2013.01); *B60N 2/28* (2013.01); *B60N 2/2806* (2013.01); *B60N 2/289* (2013.01); *B60N 2/2821* (2013.01); *B60N 2/2863* (2013.01); *B60N 2/2893* (2013.01); *B60N 2/3011* (2013.01); *B60P 7/0823* (2013.01)

(58) Field of Classification Search
CPC ........ B60N 2/206; B60N 2/28; B60N 2/2806; B60N 2/2821; B60N 2/2863; B60N 2/289; B60N 2/2893; B60N 2/3011; B60N 2/20
USPC ........................................ 297/188.04–188.06
See application file for complete search history.

(56) References Cited

U.S. PATENT DOCUMENTS

| | | | | |
|---|---|---|---|---|
| 4,936,627 | A * | 6/1990 | Guim | B60N 2/3084 297/238 |
| 5,409,293 | A * | 4/1995 | Nagasaka | B60N 2/26 297/105 |
| 7,458,635 | B2 * | 12/2008 | Mendis | B60N 2/206 297/112 |
| 7,871,124 | B1 * | 1/2011 | Hinds | B60N 2/2806 297/234 |
| 2009/0051188 | A1 * | 2/2009 | Foussianes | B60N 2/002 296/65.01 |

(Continued)

*Primary Examiner* — Mark R Wendell
(74) *Attorney, Agent, or Firm* — Parks IP Law LLC

(57) ABSTRACT

A vehicle-seat mounting system, for securing a child seat in a vehicle, including a collapsible vehicle seat comprising a vehicle seat back configured to be movably connected to a vehicle-seat base. The system also includes a vehicle-seat-back securing structure being connected to, or part of, a rear of the vehicle seat back. The vehicle-seat-back securing structure is configured and arranged at the rear of the vehicle seat back to mate securely with child-seat securing structure corresponding in size and shape to the vehicle-seat-back securing structure. In various embodiments, the technology includes (i) parts of the vehicle seat, such as a kit including the vehicle-seat-back securing structure, (ii) the child seat, or (iii) parts thereof.

11 Claims, 5 Drawing Sheets

(56) References Cited

U.S. PATENT DOCUMENTS

| | | | | |
|---|---|---|---|---|
| 2010/0156133 A1* | 6/2010 | Bhatia | .................... | B60N 2/366 |
| | | | | 296/65.09 |
| 2012/0119479 A1* | 5/2012 | Parker | .................. | B60N 2/2809 |
| | | | | 280/807 |
| 2014/0265484 A1* | 9/2014 | Elharar | .................... | B60N 2/28 |
| | | | | 297/232 |
| 2015/0258921 A1* | 9/2015 | Chung | ................. | B60N 2/2821 |
| | | | | 297/256.16 |

* cited by examiner

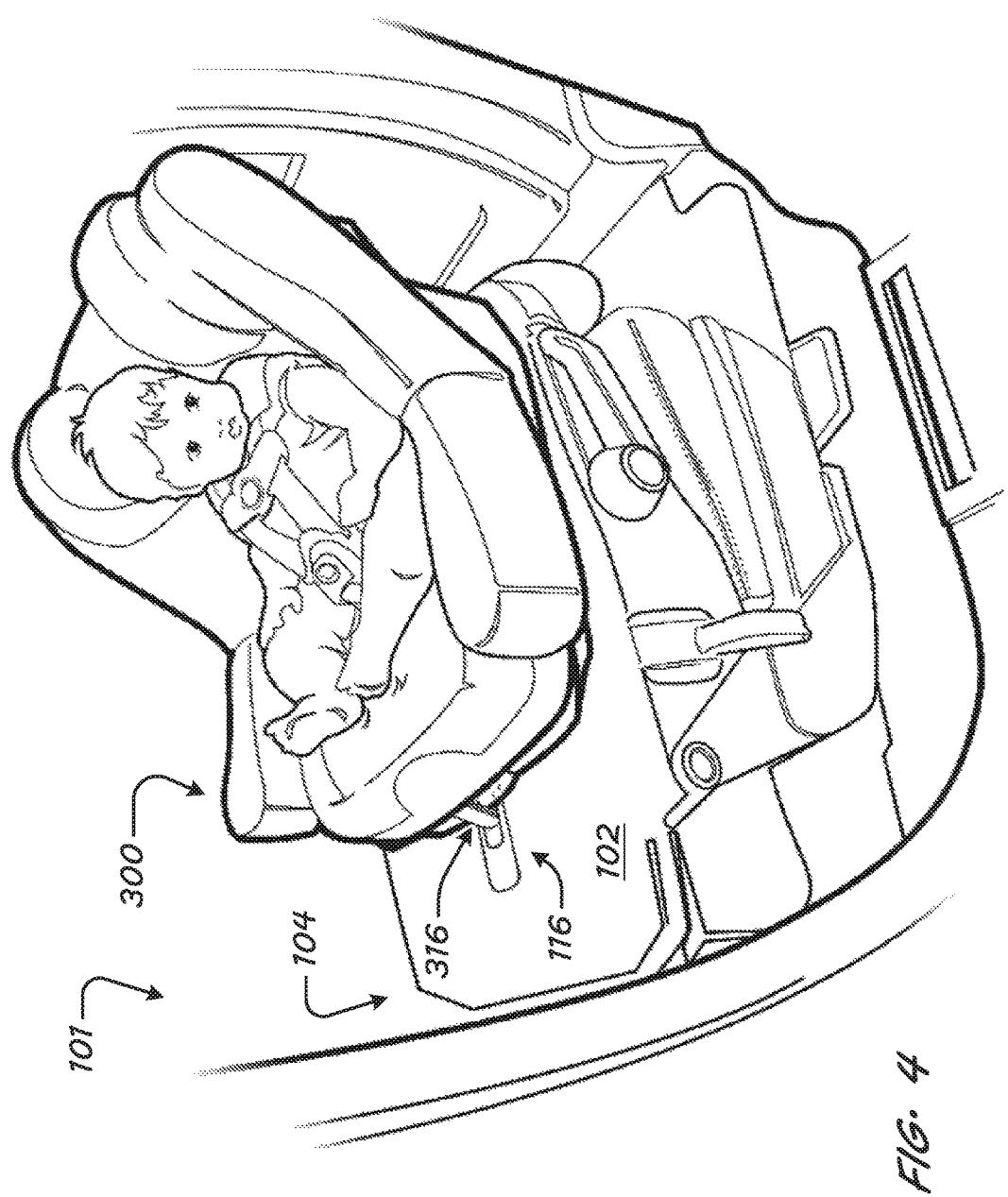

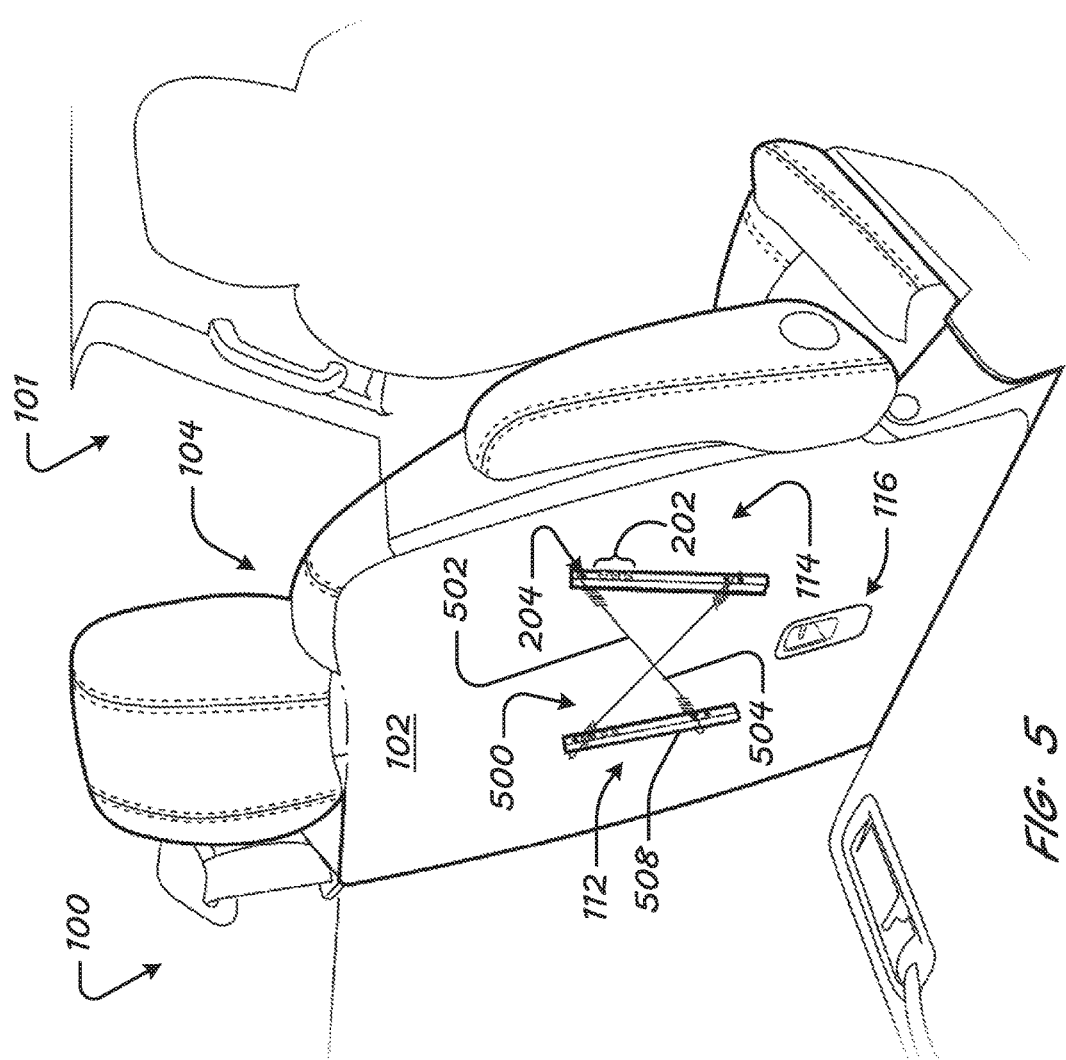

CHILD-SEAT MOUNTING SYSTEM

TECHNICAL FIELD

The present disclosure relates generally to vehicle seats and, more particularly, to a flexible and convenient vehicle seats configured to mate securely with specially configured infant seats. The vehicle-seat system can be referred to as a child-seat mounting system, as in the title above, as it is for mounting a child seat therein.

BACKGROUND

Modern child car seats are safer than prior models, due in large part to improved structure and materials.

Many seats are also easier to use than prior models, by being easier to install, secure the child within, and remove the seat, for instance.

Traditional seats and seat-mounting systems, while more reliable than their predecessors, present challenges. One is that, depending on vehicle design, it is often difficult to use the rear passenger-seating area selectively, at times, for seating an adult or older child and, at other times, for using a child seat.

SUMMARY

The present disclosure relates to a vehicle-seat mounting system allowing easy interchange between using a seating area in a rear of a vehicle for seating an adult or older child and mounting an infant or child seat.

The system includes one or more securing components mounted on a back of a vehicle seat. The vehicle seat back is configured to allow a user to fold the vehicle seat back from an upright position, forward, onto a base or cushion of the vehicle seat, moving the securing component on the seat back to an upward-facing position. With the vehicle seat in this folded position, the securing component is arranged to receive and releasable yet securely connect to a specially configured child seat.

In various embodiments, the securing component(s) includes one or more rails or slots. And the specially configured child seat includes corresponding securing structure, configured to mate with the securing components of the vehicle seat back.

In some embodiments, the securing component(s), of the child seat and/or vehicle seat, include a locking component configured and arranged at the back of the vehicle seat to connect to a mating locking structure of the infant or child car seat.

In various embodiments, with the child seat connected to a back of the vehicle seat, the vehicle seat can be moved between a collapsed position, in which the child seat can be used, and an upright, or open position, in which the child seat is not used and the vehicle seat can be used by an adult or older child, without disconnecting the child seat from the vehicle seat.

Other aspects of the present technology will be in part apparent and in part pointed out hereinafter.

DESCRIPTION OF THE DRAWINGS

FIG. 4 illustrates the arrangement of FIG. 3, with the child seat connected to the child-seat mounting apparatus, and a child secured therein.

FIG. 5 illustrates the vehicle-seat mounting apparatus of FIG. 1, having at least one additional cargo-securing feature.

The figures are not necessarily to scale and some features may be exaggerated or minimized, such as to show details of particular components. In some instances, well-known components, systems, materials or methods have not been described in detail in order to avoid obscuring the present disclosure. Specific structural and functional details disclosed herein are not to be interpreted as limiting, but merely as a basis for the claims and as a representative basis for teaching one skilled in the art to variously employ the present disclosure.

DETAILED DESCRIPTION

I. Introduction

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model, or pattern.

References herein to how a feature is arranged can refer to, but are not limited to, how the features is positioned with respect to other features. References herein to how a feature is configured can refer to, but are not limited to, how the feature is sized, shaped, and/or material of the feature. For simplicity, the term configured can be used to refer to both the configuration and arrangement described above in this paragraph.

Specific structural and functional details disclosed herein are not to be interpreted as limiting, but merely as a basis for the claims and as a representative basis for teaching one skilled in the art to employ the present disclosure.

While the present technology is described primarily in connection with automobiles, the technology is not limited to automobiles. The concepts can be used in a wide variety of applications, such as in connection with aircraft and marine craft.

II. Open Vehicle Seat with Child-Seat Mounting Apparatus—FIG. 1

Figure 1:
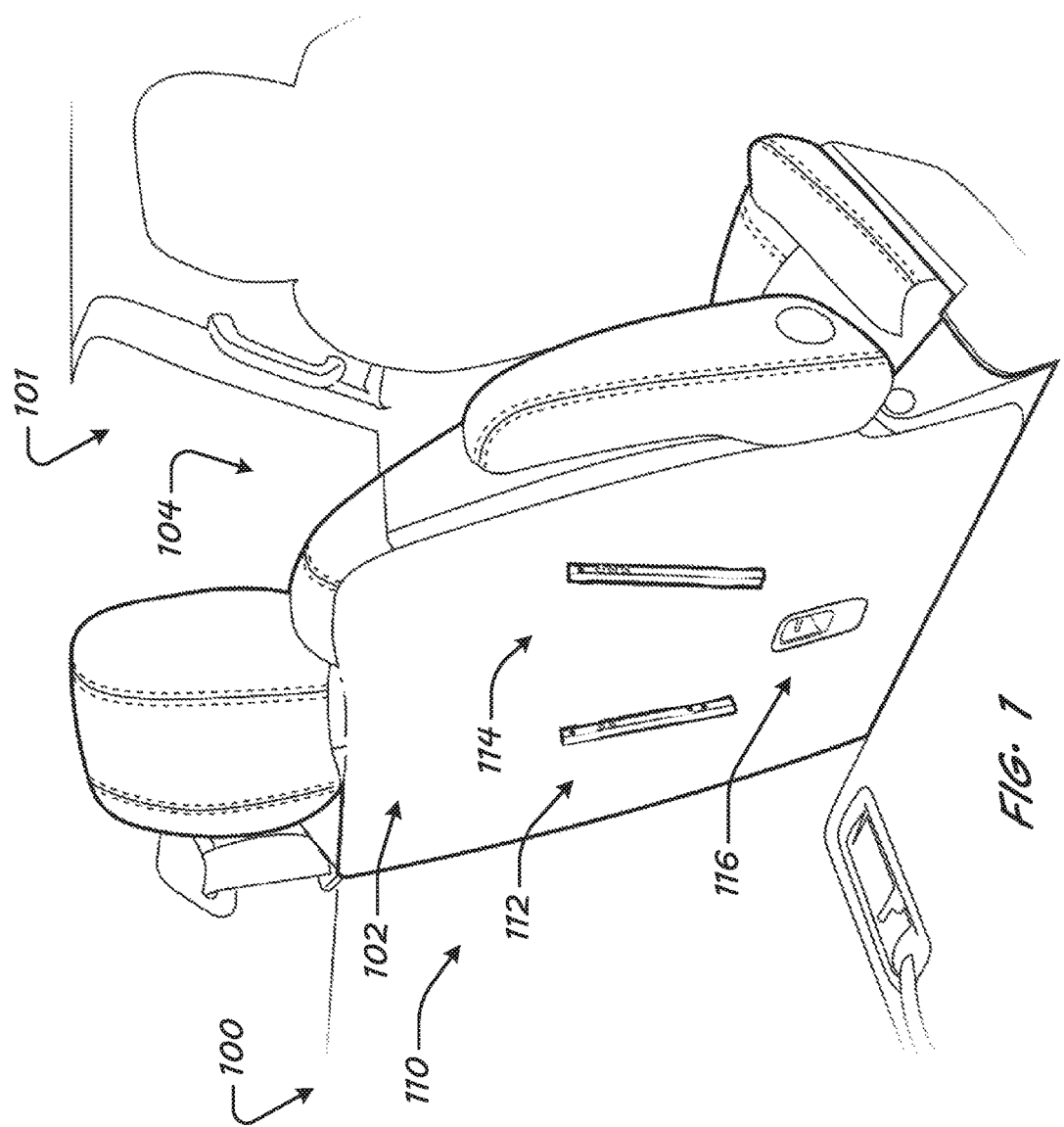
FIG. 1 illustrates a first example child-seat mounting apparatus at a back of a vehicle seat arranged in an open, adult-seating, position, according to an embodiment of the present disclosure.

Now turning to the figures, and more particularly to the first figure, FIG. 1 illustrates a first example foldable, or collapsible vehicle-seat mounting apparatus 100 for use in a vehicle 101. The apparatus 100 is positioned at a rear of a back 102 of a vehicle seat 104.

The vehicle seat 104 shown is a second- or subsequent-row seat of the vehicle 101. The vehicle seat 104 is shown arranged in an open position in FIG. 1.

As all terms herein, the open seat position can be referred to by other descriptive terms, such as upright position or adult-seating position.

The vehicle-seat mounting apparatus 100 includes one or more child-seat mounting components 110 as part of, or connected to, the vehicle seat 104.

In the example of FIG. 1, the child-seat mounting components 110 include one or more vehicle-seat alignment structures 112, 114 and/or an anchoring structure 116. The anchoring structure 116 is shown by way of example being positioned lower on the vehicle seat back 102 than the vehicle-seat alignment structures 112, 114.

The alignment structure(s) 112, 114 can be referred to by other terms, such as rails, slots, bars, elongated anchors, combinations of these, the like, or other.

The vehicle-seat mounting components 110—e.g., 112, 114, 116—are configured (e.g., sized and shaped) and arranged (e.g., positioned) to engage with corresponding features of the child seat. The child seat is indicated by reference numeral 300 in FIG. 3, and example corresponding child-seat securing features thereof are indicated there by numerals 312, 314, 316, corresponding to the vehicle-seat mounting components 112, 114, 116.

In a contemplated embodiment (not shown in detail), the apparatus 100 includes a single alignment structure, such as a centrally positioned rail or slot configured to engage with a single positioned slot or rail positioned on a bottom of the child seat.

In a contemplated embodiment, the mounting components 110 are configured, or connected or connectable to protecting parts (not shown), to limit unwanted interference to any aft passengers or objects when the vehicle seat 104 is upright. The alignment structures 112 can be formed with rounded edges, for instance, and/or of a material, such as a strong plastic, that is less likely to interfere with the aft passengers or objects. The anchoring structure 116 can be largely embedded into the rear of the vehicle seat back 102, as shown in FIG. 1.

In another contemplated embodiment, the child-seating apparatus 100 includes protecting parts, such as one or more adjustable (e.g., selectively removable/attachable) covers—embodiment not shown in detail. The covers are in some embodiments configured and movably connected to the vehicle seat back so as to be readily or easily moved by a user or automated equipment—e.g., mechanical actuator that a user or vehicle computer or circuit can control at the user's prompting, such as by button. Each cover if movable from a covering position to an exposed position, by which the relevant mounting component(s) 100 is covered and uncovered, respectively. The covers could be configured to be easily secured to and then removed from, or otherwise moved with respect to, the alignment structures 112, 114. Each cover could be configured to be rotated, slide, hingedly moved, e.g., to/from a withdrawn or non-covering, or non-blocking, position, for instance. The cover can be, for instance, moved to be positioned fully or more beneath a surface of the rear of the seat back 102, thereby exposing more of the alignment structure 112 or 114 for use then to alight and/or secure the child seat (child seat shown in FIG. 3). Each cover can be temporarily lockable in various positions—e.g., covering and non-covering—to avoid unwanted cover movement. For instance, the cover can include protrusions or dimples arranged to engage a frame when the cover is in one or more cover positions, to keep the cover in the selected position—e.g., covering position or non-covering position.

III. Collapsed Vehicle Seat with Child-Seat Mounting Apparatus—FIG. 2

Figure 2:
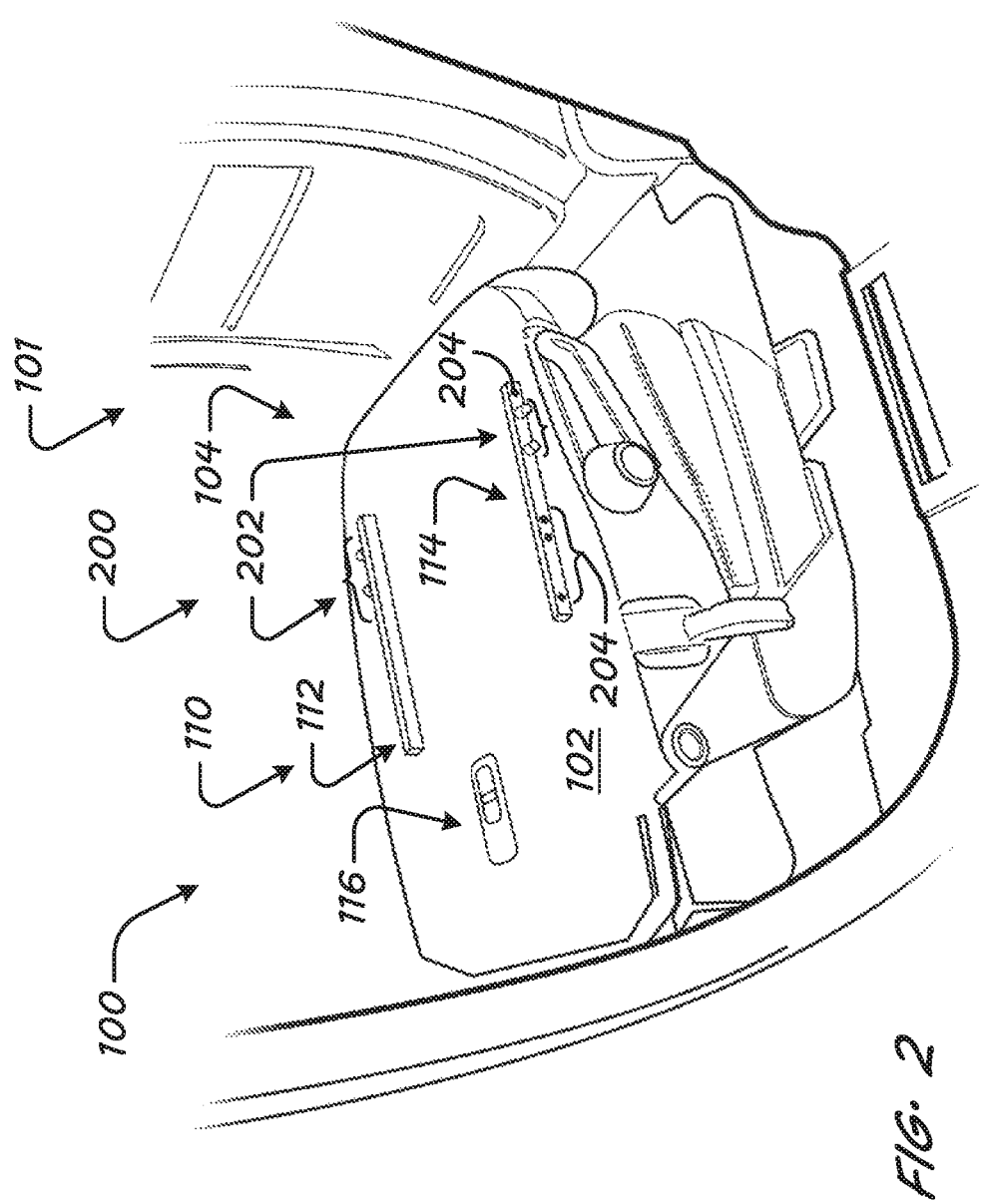
FIG. 2 illustrates the child-seat mounting apparatus of FIG. 1 in a closed, folded position.

FIG. 2 illustrates the vehicle-seat mounting apparatus 100 of FIG. 1 on the vehicle seat 104 moved to a collapsed position. The position can be referred to by other terms, such as closed position or folded position.

With the vehicle seat 104 collapsed, the vehicle-seat mounting apparatus 100 is generally facing upward. In this position, the vehicle-seat mounting apparatus 100 is ready to receive the child seat, shown in FIG. 3.

As shown best in FIG. 2, the alighting structure(s) 112, 114 can include engaging parts 200. The engaging parts 200 can include one or more alignment-structure protrusions 202 and/or one or more alignment-structure depressions or recessions 204 (or depression, recess, void, etc.) configured and arranged to engage corresponding child-seat engaging parts (not shown). The child seat 300 can include one or more corresponding child-seat recesses and/or one or more corresponding child-seat protrusions, for example.

IV. Child-Seat Installation—FIG. 3

Figure 3:
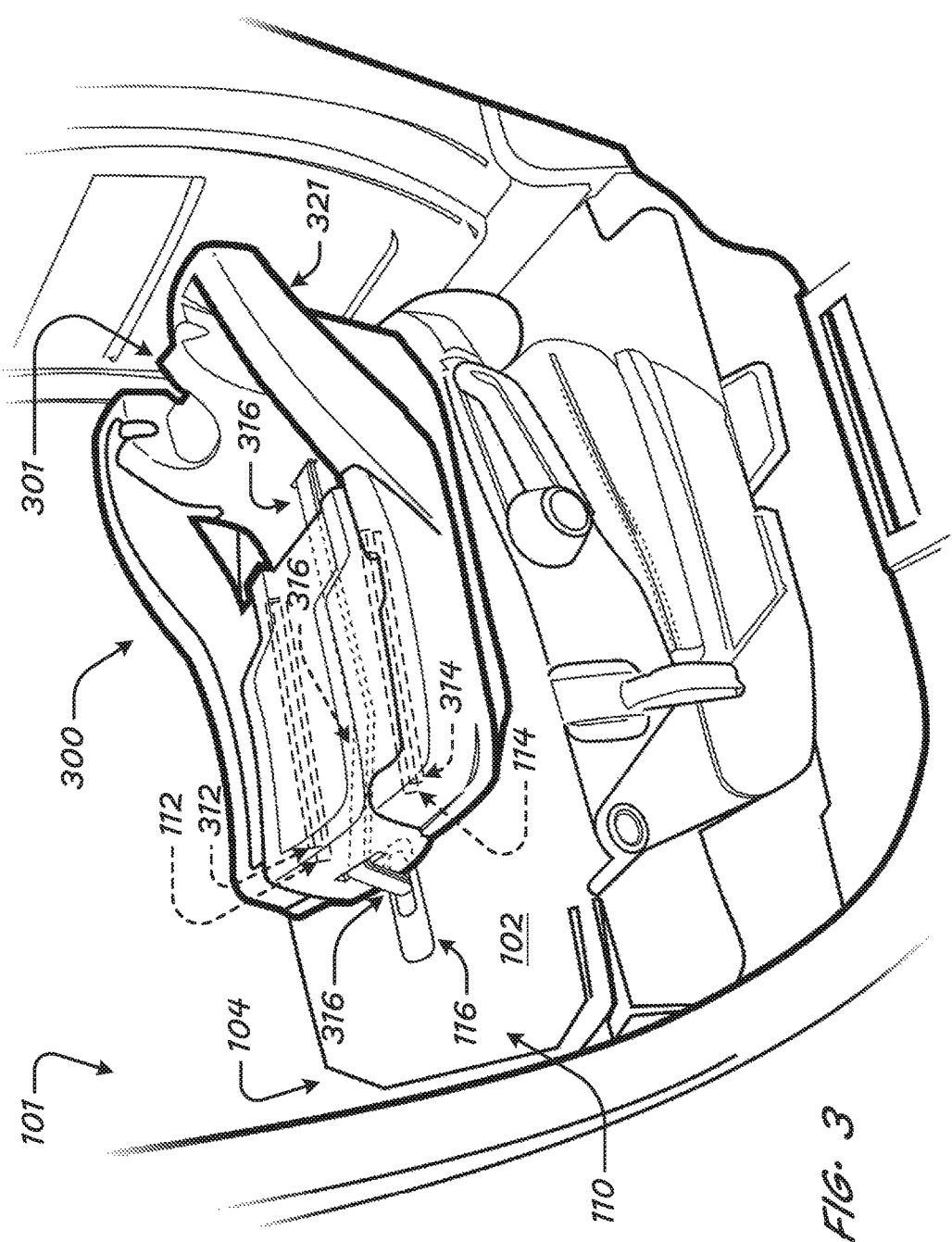
FIG. 3 illustrates the arrangement of FIG. 2, with the child seat being connected to the child-seat mounting apparatus.

FIG. 3 illustrates the arrangement of FIG. 2, with a child seat 300 being connected to the vehicle-seat mounting apparatus 100. The two are connected by, e.g., alignment structure(s) 112, 114 and anchoring structure 116 described and shown.

As mentioned, the child-seat mounting components 110—e.g., 112, 114, 116—are configured (e.g., sized and shaped) and arranged (e.g., positioned) to engage with corresponding securing features of the child seat. The child seat is indicated by reference numeral 300 in FIG. 3, and example corresponding securing features thereof are indicated in FIG. 3 by numerals 312, 314, 316.

In various embodiments, the child-seat securing feature 316 is configured and arranged to engage the anchoring structure 116 of the vehicle-seat mounting apparatus 100. The child-seat securing feature 316 can be, or include, a tether, a hook, a clasp, strap, etc.

In some embodiments, the child-seat securing feature 316 extends, as shown in FIG. 3, from the anchoring structure 116, into or beneath a body of the seat 300, toward a position whereat a user can easily adjust the securing feature 316, such as toward and out of a rear, or head 301 of the child seat 300.

The child-seat securing feature 316 can be movably connected to the child seat 300, such as to allow a user to move the feature 316, using a handle—e.g., extending from the rear 301 of the seat 300—to and/or from a secured position wherein the child seat 300 is locked to the vehicle seat 104 by way of the anchoring structure 116.

The child-seat alignment components 314, 316 are shown in FIG. 3 engaging the corresponding vehicle-seat alignment structures 112, 114. The engagement provides benefits including securing the child seat 300 from moving during use, including securing the child seat from moving laterally, fore/aft, lifting up, and from rotating.

In various embodiments, the engagement parts 202, 204 (FIG. 2) of the vehicle-seat alignment structures 112, 114 are configured to further secure the connected child seat from moving in these manners, and from moving fore or aft.

As mentioned, in various embodiments, after the child seat 300 is connected to a rear of the back 102 of the vehicle seat 104, the vehicle seat 104 can be moved between the collapsed position (FIG. 3), in which the child seat 300 can be used to secure a child (as shown in FIG. 4), and the upright, or open position, in which the child seat is not used to hold a child and the vehicle seat 104 can be used by an adult or older child, without disconnecting the child seat 300 from the vehicle seat 104.

V. Child Seat Secured in Vehicle and Holding Child—FIG. 4

FIG. 4 illustrates the arrangement of FIG. 3, with the child seat 300 connected to the child-seat mounting apparatus, and a child positioned in the secured child seat 300.

The view shows that the child seat 300 may include padding, arm rests, etc., for the comfort and possibly also securement and safety of the child.

VI. Vehicle-Seat Upright with Securing Feature—FIG. 5

FIG. 5 illustrates the vehicle-seat mounting apparatus 100 of FIG. 1, having at least one cargo-securing feature 500.

The cargo-securing feature 500 is connected to, or a part of, the vehicle-seat mounting apparatus 100. In the embodiment of FIG. 5, the cargo-securing feature 500 is shown connected to the vehicle-seat alignment structures 112, 114.

In a contemplated embodiment, cargo can be secured to the mounting apparatus 100 without use of such additional features 500.

The cargo-securing feature 500 can have any of a wide variety of forms without departing from the scope of the present technology. The cargo-securing feature 500 can include one or more straps 502, as shown in FIG. 5, for instance.

In various embodiments, the straps 502, 504 can connect to the alignment structure(s) 112, 114, such as by engaging the protrusions 202, the recessions 204, and/or a body 508 of the alignment structure(s) 110 (112, 114, 116), as shown in FIG. 5.

In one implementation, the cargo-securing feature 500 includes one or more commercially available cargo straps. The rails 112, 114 can be considered tie down points for such features 500.

In a contemplated embodiment, the cargo-securing feature 500 includes or forms a pocket.

The cargo-securing feature 500 is configured, in various embodiments, to be readily removable. In particular implementations, the child seat 300 cannot be connected to the mounting apparatus until the cargo-securing feature 500 is removed or moved to and non-obstructing position.

VII. Additional Features

Many of the features and embodiments of the present technology are described above. The present section restates some of those and references some others.

In various embodiments, the present technology, the vehicle seat, when collapsed, creates a generally flat load floor, configured with connecting structure—e.g., rails—so that the child seat can be affixed to the back of the vehicle seat.

The connecting structure of the vehicle seat and the child seat are configured in various embodiments so that the child seat can be easily and readily connected to—e.g., snapped, locked, buckled, and/or tethered to—the back of the vehicle seat, and easily and readily removed—e.g., unsnapped, unlocked, unbuckled, and/or untethered—therefrom.

VIII. Select Benefits of the Present Technology

Many of the benefits and advantages of the present technology are described above. The present section restates some of those and references some others. The benefits described are not exhaustive of the benefits of the present technology.

The technology enables easy connection and disconnection of a special configured child seat 104 to/from the vehicle seat 104.

Great convenience is provided by described embodiments in which, after the child seat 300 is connected to rear of the back 102 of the vehicle seat 104, the vehicle seat 104 can be moved between (i) the closed or collapsed position (FIG. 3), in which the child seat 300 can be used to secure a child (FIG. 4), and, without disconnecting the child seat 300 from the vehicle seat 104, (ii) the upright, or open position, in which the child seat 300 is not used to hold the child and the vehicle seat 104 can be used by an adult or older child.

Conveniences include time and energy savings for users, including busy parents. Time and energy is saved by obviating need to disconnect the child car seat 300 from the vehicle seat 104 when it is desired to use the vehicle seat 104 for adult or older-child seating, for instance.

IX. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A vehicle-seat mounting system, for securing a child seat in a vehicle, comprising:
    a collapsible vehicle seat comprising a vehicle seat back configured to be movably connected to a vehicle-seat base;
    a vehicle-seat-back securing structure being connected to, or part of, a rear side of the vehicle seat back, the vehicle-seat-back securing structure comprising at least two alignment structures configured to attach directly to the vehicle seat back, wherein the alignment structures are configured and arranged to mate securely with child-seat securing structures positioned at or connectable to a bottom surface of a child seat corresponding in size and shape to the vehicle-seat-back securing structure; and
    a cover apparatus, wherein the cover apparatus is movably connected to the vehicle seat back to be readily movable between:
        a covering position, in which the cover apparatus covers the vehicle-seat-back securing structure and the child seat cannot connect to the vehicle-seat-back securing structure; and
        an exposing position in which the vehicle-seat-back securing structure is exposed and the child seat is able to connect to the vehicle-seat-back securing structure.

2. The vehicle-seat mounting system of claim 1, wherein the vehicle-seat-back securing structure is configured and arranged at the vehicle seat so that the collapsible vehicle seat can:
    secure the child seat in place against the rear side of the vehicle seat back while the vehicle seat is in a vehicle-seat collapsed position in which the rear side of the vehicle seat back is substantially horizontal; and
    be opened from the vehicle-seat collapsed position to an open vehicle-seat position, while the child seat remains secured to the rear side of the vehicle seat, enabling a person to sit on the vehicle-seat base while the child seat remains connected to the vehicle seat.

3. The vehicle-seat mounting system of claim 1, wherein the alignment structures include rails configured to receive corresponding child-seat securing structures.

4. The vehicle-seat mounting system of claim 1, wherein:
    the alignment structures includes at least one alignment feature selected from a group of alignment features consisting of an alignment-structure protrusion and an alignment-structure recess.

5. The vehicle-seat mounting system of claim 1, wherein the vehicle-seat-back securing structure comprises an anchoring component.

6. The vehicle-seat mounting system of claim 1, further comprising a cargo-securing component connected to the vehicle-seat-back securing structure.

7. A vehicle-seat mounting system, for securing a child seat in a vehicle, comprising:
   a vehicle seat back comprising a rear side;
   a vehicle-seat-back securing structure being connected to or part of the rear side of the vehicle seat back, the vehicle-seat-back securing structure comprising at least two alignment structures configured to attach directly to the vehicle seat back, wherein the alignment structures are configured to mate securely with child-seat securing structures positioned at or connectable to a bottom surface of a child seat; and
   a cover apparatus, wherein the cover apparatus is movably connected to the vehicle seat back to be readily movable between:
      a covering position, in which the cover apparatus covers the vehicle-seat-back securing structure and the child seat cannot connect to the vehicle-seat-back securing structure; and
      an exposing position in which the vehicle-seat-back securing structure is exposed and the child seat is able to connect to the vehicle-seat-back securing structure.

8. The vehicle-seat mounting system of claim 7, wherein the vehicle-seat-back securing structure is configured and arranged at the vehicle seat so that a collapsible vehicle seat can:
   secure the child seat in place against the rear side of the vehicle seat back while the vehicle seat is in a vehicle-seat collapsed position in which the rear side of the vehicle seat back is substantially horizontal; and
   be opened from the vehicle-seat collapsed position to an open vehicle-seat position, while the child seat remains secured to the rear side of the vehicle seat, enabling a person to sit on the vehicle seat while the child seat remains connected to the vehicle seat.

9. The vehicle-seat mounting system of claim 7, wherein:
   the alignment structures includes at least one alignment feature selected from a group of alignment features consisting of an alignment-structure protrusion and an alignment-structure recess.

10. The vehicle-seat mounting system of claim 7, wherein the vehicle-seat-back securing structure comprises an anchoring component.

11. The vehicle-seat mounting system of claim 7, further comprising a cargo-securing component connected to the vehicle-seat-back securing structure.

* * * * *